US006255448B1

(12) United States Patent
Grimaldi et al.

(10) Patent No.: US 6,255,448 B1
(45) Date of Patent: *Jul. 3, 2001

(54) POLYMERIZATION IN THE PRESENCE OF A β-SUBSTITUTED NITROXIDE RADICAL

(75) Inventors: Sandra Grimaldi, Aix-en-Provence; François Lemoigne, Marseille; Jean-Pierre Finet, Raphele les Arles; Paul Tordo, Marseille; Pascal Nicol, Pau; Muriel Plechot, Orthez; Yves Gnanou, Talence, all of (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/687,543

(22) PCT Filed: Feb. 2, 1996

(86) PCT No.: PCT/FR96/00180

§ 371 Date: May 22, 1997

§ 102(e) Date: May 22, 1997

(87) PCT Pub. No.: WO96/24620

PCT Pub. Date: Aug. 15, 1996

(30) Foreign Application Priority Data

Feb. 7, 1995 (FR) .................................................. 95 01380
Jun. 13, 1995 (FR) .................................................. 95 06967

(51) Int. Cl.$^7$ ............................ C08G 75/14; C08G 79/02
(52) U.S. Cl. ......................... 528/398; 528/176; 528/322; 528/332
(58) Field of Search .................................... 528/176, 322, 528/332, 398

(56) References Cited

U.S. PATENT DOCUMENTS 5,006,663   4/1991   Berchadsky et al. .................. 548/412
5,017,458   5/1991   Soda et al. ............................ 430/296

FOREIGN PATENT DOCUMENTS

| 2 061 037 | 8/1992 | (CA) . |
| 3 917 437 | 11/1989 | (DE) . |
| 39 17 473 | 11/1989 | (DE) . |
| 294 493 | 10/1991 | (DE) . |
| 0 035 291 | 9/1981 | (EP) . |
| 0 135 280 | 3/1985 | (EP) . |
| 0 157 738 | 10/1985 | (EP) . |
| 0 488 403 | 6/1992 | (EP) . |
| 0 499 581 | 8/1992 | (EP) . |
| 0 512 951 | 11/1992 | (EP) . |
| 0 641 822 | 3/1995 | (EP) . |
| 2333813 | 7/1977 | (FR) . |
| 1199351 | 7/1970 | (GB) . |
| 1-100182 | 4/1989 | (JP) . |

OTHER PUBLICATIONS

Kirillova et al., "Stabilization of high impact polystyrene", Journal of Applied Chemistry of the USSR, vol. 52, No. 9, Mar. 10, 1980, pp. 1948–1951.
Encyclopedia Of Polymer Science And Engineering, J. Wiley and Sons, New York, vol. 16, pp. 21–28 and 88–89.
G. Odian, Principle Of Polymerization, J. Wiley and Sons, New York, pp. 679–680.
R.W. Murray and M. Singh, Tetrahedron Letters, 1988, 29(37), pp. 4677–4680.
J. Am. Chem. Soc., 1967, 89(12), pp. 3055–3056.
related application 08597,231 filed Feb. 6, 1996.
continuation of 08/597,231 filed Dec. 22, 1997, no serial number assigned yet.
related application 08/597,232 filed Feb. 6, 1996.
related application 09/136,829 filed Aug. 19, 1998, a divisional application of 08/597,232.
P. Tordo et al. "Phosphorus–Substituted Nitroxides. 3.$^4$ Hyperconjugative ability of Carbon–Phosphorus bonds in Five–Membered Ring Nitroxides", J. of Phys. Chem., vol. 82, No. 15, pp. 1742–1744, 1978.
V. Reznikov et al. "Stable Nitroxides With Hydrogen At α–carbon of the Nitroxyl Group", Tetrahedron Letters, vol. 35, No. 14, pp. 2239–2240, 1994.
M. Skorobogatova et al., "Synthesis of α,α'–Bisdialkylphosphonoisopropylnitroxyls", English Translation of Izv. Akad. Nauk SSSR, Ser. Khim. (1979), (8), 1867–8.

Primary Examiner—Terressa M. Boykin
(74) Attorney, Agent, or Firm—Pennie & Edmonds LLP

(57) ABSTRACT

The invention relates to a process for the polymerization or copolymerization of at least one monomer which is polymerizable by the radical route in the presence of a stable free radical from the nitroxide family. The stable free radical is β-substituted and provides excellent control of polydispersity while ensuring a better rate of polymerization or copolymerization, if they are compared with the stable free radicals used in the prior art.

43 Claims, No Drawings

POLYMERIZATION IN THE PRESENCE OF A β-SUBSTITUTED NITROXIDE RADICAL

TECHNICAL FIELD

The invention relates to a process for the polymerization or copolymerization of at least one monomer which is polymerizable by the radical route in the presence of a stable free radical of the nitroxide family.

PRIOR ART

The presence of a stable free radical during the polymerization or copolymerization of monomers provides for control of polymerization and results in polymers of narrower polydispersity.

The quality of a polymerization or copolymerization control can also be assessed by observation of the increase in the number-average molecular mass as a function of the percentage of conversion of the monomers to polymer or copolymer. When control is good, the number-average molecular mass is linearly proportional to the percentage of conversion. The greater the departure from linearity, the less good the control.

U.S. Pat. No. 4,581,429 describes a process for the manufacture of oligomers at low temperature and with low degrees of conversion which makes use of a compound of formula =N—O—X in the polymerization mixture.

U.S. Pat. No. 5,322,912 and U.S. Pat. No. 5,401,804 illustrate the effect of stable free radicals on the polymerization of styrene. U.S. Pat. No. 5,412,047 illustrates the effect of stable free radicals on the polymerization of acrylates. U.S. Pat. No. 5,449,724 illustrates the effect of stable free radicals on the polymerization of ethylene. The documents which have just been cited mention, as stable free radicals, cyclic molecules which have a group of low molecular mass in the position B to the nitrogen atom of the nitroxide group, which molecules have in particular the disadvantage of greatly slowing down the rate of polymerization or copolymerization, so that it is sometimes difficult, or indeed impossible, to carry out this polymerization or copolymerization at a temperature which is sufficiently low for the polydispersity of the final polymer to be sufficiently narrow.

Indeed, the greater the temperature of the mixture, the poorer the control of the polymerization or copolymerization, so that the final polymer or copolymer exhibits a higher polydispersity.

STATEMENT OF THE INVENTION

The invention overcomes the disadvantages mentioned above. The stable free radicals introduced in the context of the present invention provide excellent control of polydispersity while ensuring a better rate of polymerization or copolymerization, if they are compared with the stable free radicals made use of by the prior art.

Another advantage of the invention is to make possible the preparation of block copolymers. Indeed, the polymerization of a first monomer in the presence of a stable free radical results in a living polymer block. It is then possible to join a block of another polymer to this first block by placing the first living polymer block in a polymerization mixture of a second monomer. It is thus possible to produce block copolymers, for example copolymers comprising one or a number of polystyrene blocks and one or a number of polybutadiene blocks. The preparation of such copolymers is usually very difficult by the radical routes of the prior art and, for their preparation, copolymerization processes by the anionic route are generally resorted to.

The production of such copolymers by the radical route requires good control of the polymerization of each of the blocks. Indeed, if a termination reaction interrupts the growth by polymerization of a block, it will not be possible to join to it a block of another monomer. Termination reactions must therefore be as infrequent as possible. There are fewer termination reactions when, during polymerization, the number-average molecular mass is more linearly proportional to the percentage of conversion. The existence of termination reactions is reflected by a decrease in the rate of increase in the number-average molecular mass as a function of the percentage of conversion.

The invention relates to the polymerization or copolymerization of at least one monomer which is polymerizable in the presence of a stable free radical from the nitroxide family comprising a sequence of formula:

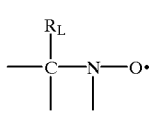

(1)

in which the $R_L$ radical has a molar mass greater than 15. The monovalent $R_L$ radical is said to be in the β position with respect to the nitrogen atom of the nitroxide radical. The remaining valencies of the carbon atom and of the nitrogen atom in the formula (1) can be bonded to various radicals such as a hydrogen atom or a hydrocarbon radical, such as an alkyl, aryl or aralkyl radical, comprising from 1 to 10 carbon atoms. It is not excluded for the carbon atom and the nitrogen atom in the formula (1) to be connected to one another via a bivalent radical, so as to form a ring. However, the remaining valencies of the carbon atom and of the nitrogen atom of the formula (1) are preferably bonded to monovalent radicals. The $R_L$ radical preferably has a molar mass greater than 30. The $R_L$ radical can, for example, have a molar mass of between 40 and 450. The radical $R_L$ can, by way of example, be a radical comprising a phosphoryl group, it being possible for the said $R_L$ radical to be represented by the formula:

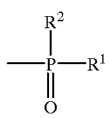

(2)

in which $R^1$ and $R^2$, which can be identical or different, can be chosen from alkyl, cycloalkyl, alkoxy, aryloxy, aryl, aralkyloxy, perfluoroalkyl and aralkyl radicals and can comprise from one to 20 carbon atoms. $R^1$ and/or $R^2$ can also be a halogen atom, such as a chlorine or bromine or fluorine or iodine atom. The $R_L$ radical can also comprise at least one aromatic ring, such as the phenyl radical or the naphthyl radical, it being possible for the latter to be substituted, for example by an alkyl radical comprising from one to four carbon atoms.

By way of example, the stable free radical can be chosen from the following list:
tert-butyl 1-phenyl-2-methylpropyl nitroxide,
tert-butyl 1-(2-naphthyl)-2-methylpropyl nitroxide,
tert-butyl 1-diethylphosphono-2,2-dimethylpropyl nitroxide, tert-butyl 1-dibenzylphosphono-2,2-dimethylpropyl nitroxide,
phenyl 1-diethylphosphono-2,2-dimethylpropyl nitroxide,
phenyl 1-diethylphosphono-1-methylethyl nitroxide,
1-phenyl-2-methylpropyl 1-diethylphosphono-1-methylethyl nitroxide.

The stable free radical can be introduced into the polymerization or copolymerization mixture in the proportion of 0.005% to 5% by weight of the sum of the mass of polymerizable monomer and of stable free radical.

Within the context of the present invention, any monomer exhibiting a carbon-carbon double bond capable of polymerizing or copolymerizing by the radical route can be used.

At least one monomer present in the polymerization or copolymerization medium can be a vinylaromatic monomer or an olefin or a diene or an acrylic or methacrylic monomer. The monomer can also be vinylidene difluoride or vinyl chloride.

Vinylaromatic monomer is understood to mean styrene, styrene substituted on the vinyl group by an alkyl group, such as alpha-methylstyrene, or ortho-vinyltoluene, para-vinyltoluene, ortho-ethylstyrene or 2,4-dimethylstyrene, or styrene substituted on the ring by a halogen, such as for example 2,4-dichlorostyrene, as well as vinylanthracene.

Diene is understood to mean in particular a conjugated diene comprising from 4 to 8 carbon atoms, such as 1,3-butadiene, isoprene, 2,3-dimethyl-1,3-butadiene or piperylene.

The process according to the invention is more particularly effective in the case of vinylaromatic monomers and dienes.

The polymerization or copolymerization is carried out under the usual conditions known to the person skilled in the art, taking into account the monomer or monomers under consideration, since this polymerization or copolymerization takes place by a radical mechanism, with the difference that the β-substituted stable free radical in accordance with the invention is added to the mixture. Depending on the nature of the monomer or monomers which it is desired to polymerize or copolymerize, it may be necessary to introduce a free-radical initiator into the polymerization or copolymerization mixture. The person skilled in the art knows the monomers which require the presence of such an initiator for this monomer to polymerize or copolymerize. For example, the polymerization or copolymerization of a diene requires the presence of a free-radical initiator.

The free-radical initiator can be introduced into the polymerization or copolymerization mixture in the proportion of 50 to 50,000 ppm based on the mass of polymerizable or copolymerizable monomer.

The free-radical initiator can be, for example, chosen from those of peroxide type or of azo type. Mention may be made, by way of example, of the following initiators: benzoyl peroxide, lauroyl peroxide, tert-butyl peracetate, tert-amyl perpivalate, butyl per-2-ethylhexanoate, tert-butyl perpivalate, tert-butyl perneodecanoate, tert-butyl perisononanoate, tert-amyl perneodecanoate, tert-butyl perbenzoate, di-2-ethylhexyl peroxydicarbonate, dicyclohexyl peroxydicarbonate, cumyl perneodecanoate, tert-butyl permaleate, 2,2'-azobis(isobutyronitrile), 2,2'-azobis(2,4-dimethylvaleronitrile), 2,2'-azobis(cyclohexanecarbonitrile), 2,2'-azobis(2-methylbutyronitrile) and 2,2'-azobis(2,4-dimethyl-4-methoxyvaleronitrile).

In the case where the mixture comprises a vinylaromatic monomer and where excellent control of the growth of the polymer or copolymer is desired, so that the latter has a particularly narrow polydispersity, it is preferable to carry out the polymerization or copolymerization at a temperature at which no polymerization or copolymerization is observed in the absence of free-radical initiator and to add a free-radical initiator to the mixture. For example, in the case of the polymerization or copolymerization of at least one vinylaromatic monomer, this situation exists when the temperature is less than approximately 120° C. Appreciable polymerization or copolymerization rates are nevertheless obtained by the process of the invention when the temperature is between 90 and 120° C., for example between 100 and 120° C., and when a free-radical initiator has been added to the mixture.

Nevertheless, if a higher polydispersity is accepted, heating the mixture to higher temperatures is not excluded.

Thus, in the case where the mixture comprises a vinylaromatic monomer, the polymerization or copolymerization can be initiated thermally and without free-radical initiator, in which case it is generally carried out between 120 and 200° C. and preferably between 120 and 160° C. If a free-radical initiator has been introduced, it is possible to carry out the polymerization or copolymerization between 25 and 120° C. but it is also possible, depending on the nature of the initiator and in particular its half-life temperature, to heat to 200° C., if a greater rate of polymerization is preferred to the detriment of the polydispersity.

In the case where the mixture comprises a vinylaromatic monomer, the polymerization or copolymerization can be carried out in bulk, in suspension or in solution.

In the case of a diene, the polymerization or copolymerization is generally carried out in solution or suspension. The polymerization or copolymerization mixture may be intended to result in a high-impact vinylaromatic polymer, in which case it generally comprises at least one vinylaromatic monomer and one rubber, the latter generally being a conjugated polydiene such as one or a number of polybutadienes.

The invention also relates to the preparation of copolymers. For example, when at least one vinylaromatic monomer is present in the mixture, this monomer can be copolymerized with, for example, at least one monomer chosen from acrylonitrile, methacrylonitrile, acrylic acid, methacrylic acid, an alkyl ester in which the alkyl group contains from 1 to 4 carbon atoms, an N-alkylmaleimide in which the alkyl group contains from 1 to 4 carbon atoms, or N-phenylmaleimide.

Of course, depending on the polymerization or copolymerization conditions, and in particular the duration, the temperature and the degree of conversion of monomer to polymer or copolymer, it is possible to produce products of very different molecular masses.

The invention relates both to the preparation of oligomers, polymers or copolymers with a weight-average molecular mass of less than 10,000 gram/mol and to that of polymers or copolymers with a weight-average molecular mass greater than 10,000, gram/mol such as high polymers with a weight-average molecular mass generally ranging from 100,000 gram/mol to 400,000 gram/mol.

The invention relates both to polymerization or copolymerization processes in which the degree of conversion of monomer to polymer or copolymer is less than 50% and to those in which the degree of conversion of monomer to polymer or copolymer is greater than 50%.

The process for the preparation of the secondary amine can comprise a stage of reaction between:
a compound C comprising a carbonyl group,
a primary amine, a phosphorus-containing derivative comprising a phosphoryl group.

The compound C can, for example, be represented by the formula

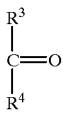

in which $R^3$ and $R_4$, which can be identical or different, can represent various radicals such as a hydrogen atom or an alkyl, aryl or aralkyl radical comprising, for example, from 1 to 10 carbon atoms. The $R^3$ and $R^4$ radicals can also be joined to one another so as to form a ring which includes the carbon atom of the carbonyl group. The compound C can be chosen from aldehydes or ketones.

By way of example, the compound C can be:
trimethylacetaldehyde,
isobutyraldehyde,
diethyl ketone,
dibutyl ketone,
methyl ethyl ketone,
cyclohexanone,
4-tert-butylcyclohexanone,
tetralone.

The primary amine can be represented by the formula $R^5$—$NH_2$ in which $R^5$ can represent, for example, a saturated or unsaturated, linear or branched hydrocarbon radical which can comprise at least one ring, the said radical comprising from 1 to 30 carbon atoms, such as an alkyl, aryl or aralkyl radical. By way of example, the $R^5$ radical can be chosen from the following radicals: methyl, ethyl, propyl, isopropyl, tert-butyl, diphenylmethyl, triphenylmethyl, phenyl, naphthyl, benzyl or 1-phenylethyl.

The phosphorus-containing derivative can be represented by the formula $HP(O)(R^6)(R^7)$ in which $R^6$ and $R^7$, which can be identical or different, can be chosen from alkyl, cycloalkyl, alkoxy, aryloxy, aryl, aralkyloxy, perfluoroalkyl or aralkyl radicals and can comprise from one to 20 carbon atoms. $R^6$ and/or $R^7$ can also be a halogen atom, such as a chlorine or bromine or fluorine or iodine atom. By way of example, the $R^6$ and $R^7$ radicals can be chosen from the following radicals: methyl, ethyl, n-propyl, isopropyl, tert-butyl, n-butyl, phenyl, benzyl, methoxy, ethoxy, trifluoromethyl or benzyloxy.

By way of example, the phosphorus-containing derivative can be: diethyl phosphonate, dibenzyl phosphonate, diisopropyl phosphonate, di-n-dodecyl phosphonate, diphenylphosphine oxide or dibenzylphosphine oxide.

In the reaction, the compound C and the primary amine are preferably first of all brought into contact and then, in a second step, the phosphorus-containing derivative is added.

The reaction stage can be carried out, for example, between 0 and 100° C. and preferably between 20 and 60° C.

The molar ratio of the phosphorus-containing derivative to the compound C is preferably greater than 1.

The molar ratio of the compound C to the primary amine preferably ranges from 0.8 to 1.5.

Following the reaction stage, the mixture contains a secondary amine, which is also the subject of the present invention. This secondary amine can, if necessary, be isolated in any suitable way.

In particular, the mixture can be acidified by an aqueous hydrochloric acid solution in order to form a hydrochloride of the secondary amine, an organic solvent, such as an ether, can then be added to the mixture in order to dissolve the species to be removed, the aqueous phase can then be isolated and then sodium carbonate can be added to this aqueous phase in order to release the secondary amine. The latter is then extracted by an organic solvent, such as an ether, to be subsequently isolated after evaporation of the solvent.

The secondary amine can be represented by the formula:

(3)

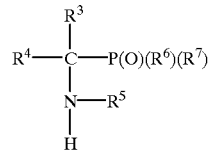

in which the $R^3$, $R^4$, $R^5$, $R^6$ and $R^7$ radicals retain the meanings given above.

The secondary amine can be used for the preparation of a nitroxide.

The process for the preparation of this nitroxide comprises, after formation of the secondary amine, a stage of oxidation of this secondary amine which is capable of replacing its >N—H group by an >N—O group. A non-exhaustive list is given below of a number of suitable techniques:

reaction of the secondary amine with hydrogen peroxide, the principle of which is taught by Patent Application EP 0,488,403;

reaction of the secondary amine with dimethyldioxirane according to the principle taught in R. W. Murray and M. Singh, Tetrahedron Letters, 1988, 29(37), 4677–4680 (or U.S. Pat. No. 5,087,752);

reaction of the secondary amine with metachloroperbenzoic acid (MCPBA), according to the principle taught in J. Am. Chem. Soc., 1967, 89(12), 3055–3056.

The techniques described in Patent Applications EP 0,157,738 and GB 1,199,351 can also be used.

As regards the method of oxidation with MCPBA, it is preferable to carry out the oxidation under the following conditions:

molar ratio of the secondary amine to MCPBA of between 0.5 and 1 and more preferably between 0.8 and 1;

temperature of between −10 and 10° C., use of an inert solvent so as to be able to exert better control over the exothermicity of the reaction. This solvent can, for example, be chosen from the family of chlorinated solvents, such as dichloromethane or chloroform.

The nitroxide can be represented by the formula:

(4)

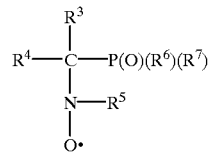

in which the $R^3$, $R^4$, $R^5$, $R^6$ and $R^7$ radicals retain the meanings given above. Following this stage of oxidation with MCPBA, the nitroxide can be purified, for example by elution on a silica column, and then isolated after evaporation of the solvents which may be necessary.

WAYS OF IMPLEMENTING THE INVENTION

The meanings of several abbreviations used in the examples are given below:
Benz. Per.: Benzoyl peroxide
AIBN: 2,2'-azobis(isobutyronitrile)
Tempo: 2,2,6,6-tetramethyl-1-piperidinyloxy
DTBN: di-tert-butyl nitroxide

EXAMPLE 1 a) Synthesis of Diethyl 2,2-dimethyl-1-(1,1-dimethylethylamino)propylphosphonate 6,68 g (0.077 mol) of pivaldehyde and 5.62 g (0.077 mol) of tert-butylamine are mixed at room temperature under a nitrogen atmosphere in a 250 ml, round-bottomed, two-necked flask equipped with a magnetic stirrer and a dropping funnel. The mixture is then brought to 30° C. for one hour. After returning to room temperature, 26.23 g (0.19 mol) of diethyl phosphonate are added dropwise to the mixture at room temperature. The mixture is then brought to 40° C. with stirring for 24 hours.

After returning to room temperature, 20 ml of diethyl ether are added and cooling is carried out to 10° C. The mixture is then acidified by a 5% by volume aqueous hydrochloric acid solution until a pH of 3 is obtained in the aqueous phase. 120 ml of diethyl ether are then added. 10 g of pure sodium hydrogencarbonate are then added until a pH of 8 is obtained in the aqueous phase. The amine is then extracted by four successive extractions, each with 60 ml of diethyl ether, and the organic phase thus obtained is then dried with approximately 5 g of anhydrous sodium sulphate. After filtration, the solvent is evaporated on a rotary evaporator at 40° C. under 1 mbar and then using a vacuum manifold at room temperature under 0.2 mbar. 19.36 g of diethyl 2,2-dimethyl-1-(1,1-dimethylethylamino)propylphosphonate were thus obtained. The NMR characteristics of this product are as follows:

$^1$H NMR in CDCl$_3$:
  0.99 ppm (s, 9H, t-Bu),
  1.06 ppm (s, 9H, t-Bu),
  1.28 ppm (t, 6H, J$_{H-H}$=7.1 Hz, CH$_3$),
  2.69 ppm (d, 1H, J$_{H-P}$=17.9 Hz, H in the position α to P),
  4.06 ppm (broad unresolved peak, 4H, J$_{H-H}$=7.1 Hz, CH$_2$)

$^{13}$C NMR in CDCl$_3$:
  16.49 ppm (d, J$_{C-P}$=5.5 Hz, C̲H$_3$—CH$_2$),
  27.90 ppm (d, J$_{C-P}$=6.1 Hz, C̲H$_3$—C—C),
  30.74 ppm (s, C̲H$_3$—C—N),
  35.24 ppm (d, J$_{C-P}$=9.6 Hz, CH$_3$—C̲—C),
  50.93 ppm (s, CH$_3$—C̲—N),
  59.42 ppm (d, J$_{C-P}$=132.9 Hz, C̲H),
  61.39 ppm (d, J$_{C-P}$=7.1 Hz, C̲H$_2$).

$^{31}$P NMR in CDCl$_3$:
  29.84 ppm.

b) Synthesis of Tert-butyl 1-diethylphosphono-2,2-dimethylpropyl Nitroxide 2.28 g (0.0082 mol) of the amine prepared in a) are dissolved in 5 ml of dichloromethane at room temperature and the solution thus obtained is then introduced into a round-bottomed flask which has been cooled to 0° C. and is equipped with a magnetic stirrer. A solution of 1.29 g (0.0075 mol) of metachloroperbenzoic acid (MCPBA) in 5 ml of dichloromethane is added dropwise. After stirring for 6 hours at room temperature, a saturated aqueous NaHCO$_3$ solution is added to the mixture until CO$_2$ elution has ceased, i.e. approximately 30 ml of this solution. The organic phase is recovered and dried with approximately 5 g of sodium sulphate. The solvent is then removed on a rotary evaporator at 40° C. under 1 mbar and then using a vacuum manifold at room temperature under 0.2 mbar. 1.39 g of an orange oil are thus obtained. This oil is purified on a column with a diameter of 4 cm and a height of 30 cm containing 100 g of silica (silica gel 60, particle size 0.040–0.063 mm) by carrying out the following procedure: A suspension is prepared comprising the 100 g of silica mixed with 200 ml of an eluent consisting of a CH$_{2Cl2}$/THF/pentane mixture in the proportions by volume of 1/1/2. The column is filled with this suspension and, after having been allowed to stand for one hour, the 1.39 g of orange oil are then deposited at the top of the column in the form of an 80 % solution by volume in the eluent. At least 200 ml of eluent are necessary to purify the product. The liquid at the foot of the column is recovered in 15 ml fractions. The volatile species are then removed, first of all on a rotary evaporator at 40° C. to a residual pressure of 1 mbar and then using a vacuum manifold at room temperature under 0.2 mbar. 1.06 g of tert-butyl 1-diethylphosphono-2,2-dimethylpropyl nitroxide are finally collected, the expanded formula of which is:

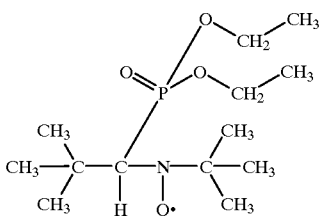

The elemental analysis of the final product is in accordance with the calculated values. The EPR data for this product are as follows:
  a$_P$=45.26 G
  a$_N$=14.27 G
  g=2.0061 (Landé factor)

This radical is stable insofar as its EPR spectrum does not show any substantial modification after storage for two months at 25° C.

For reasons of simplicity, this product is known as β-P.

EXAMPLE 2 a) Synthesis of the magnesium compound (CH$_3$)$_2$CH—MgBr 1 g (0.041 mol) of magnesium turnings, covered with 10 ml of diethyl ether, and then one crystal (approximately 5 mg) of iodine, the function of the latter being to activate the magnesium and to initiate the reaction, are placed in a 250 ml, round-bottomed, two-necked flask equipped with a magnetic stirrer and a reflux condenser comprising a drying tube filled with CaCl$_2$.

5.04 g of isopropyl bromide (0.041 mol), diluted in 10 ml of diethyl ether, are then added dropwise via a dropping funnel. The mixture is left stirring at room temperature for 3 hours.

b) Preparation of Tert-butyl 1-phenyl-2-methylpropyl Nitroxide 0.3 g of phenyl N-tert-butylnitrone (PBN), i.e. 0.0017 mol, in solution in 5 ml of diethyl ether, is placed in a 100 ml, round-bottomed, two-necked flask equipped with a magnetic stirrer and a reflux condenser and purged with nitrogen. The solution of the magnesium compound prepared in a) is then run in dropwise. 10 ml of distilled water are then added and the mixture is left stirring at room temperature for 2 hours. Extraction is then carried out with 2 times 20 ml of diethyl ether and the organic phase is then dried with 5 g of sodium sulphate. After filtration, the volatile species are removed from the organic solution using a rotary evaporator at 40° C. to 1 mbar and then using a vacuum manifold at room temperature under 0.2 mbar. 0.42 g of an orange-yellow liquid is thus obtained. Purification is then carried out on silica in a way identical to that described in Example 1b), except that the eluent is a pentane/acetone mixture in a ratio by volume of 90/10. After evaporation of the eluent in the same way as in Example 1b), 0.1 g of tert-butyl 1-phenyl-2-methylpropyl nitroxide is collected, the expanded formula of which is:

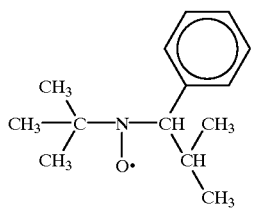

The elemental analysis of the final product is in accordance with the calculated values. The EPR data for this product are as follows:

$a_N$=15.21 G $a_N$=3.01 G.

This radical is stable insofar as its EPR spectrum does not show any substantial modification after storage for two months at 25° C. For reasons of simplicity, this product is known as β-ø.

EXAMPLES 3 TO 16

150 g of styrene, y millimol of initiator and x millimol of stable free radical are introduced at 20° C. and under a nitrogen atmosphere into a 0.25 liter stainless steel reactor equipped with a ribbon agitator and a temperature control. The whole system is brought to a temperature T (° C.). The point at which the mixture reaches the temperature T is defined as the starting point of the test.

Samples are then withdrawn in the course of time for analysis:

- of the conversion to polymer ("conv" in the tables), which corresponds to the percentage by weight of solid obtained after evaporation under a vacuum of 25 mbars for 20 minutes at 200° C. of the sample withdrawn with respect to its initial weight;
- of the weight-average molecular mass (Mw) and number-average molecular mass (Mn) and therefore of the polydispersity P which is equal to Mw/Mn, these determinations being carried out by gel permeation chromatography.

The results are combined in Tables 1 and 2 as a function of the nature and amounts x and y respectively of stable free radical and of initiator introduced. Tables 1 and 2 give the change in Mn, in conversion and in polydispersity as a function of the duration of polymerization, calculating from the starting point. Examples 10 to 16 are comparative.

|  |  | Example No. | | | | | | |
| --- | --- | --- | --- | --- | --- | --- | --- | --- |
|  |  | 3 | 4 | 5 | 6 | 7 | 8 | 9 |
| Stable free radical | Nature | β-P | β-P | β-P | β-P | β-P | β-P | β-ø |
|  | Amount x (millimol) | 9.42 | 1.53 | 1.53 | 0.75 | 1.09 | 5.78 | 9.55 |
| Initiator | Nature | Benz. Per. | Benz. Per. | Benz. Per. | Benz. Per. | AIBN | AIBN | Benz. Per. |
|  | Amount y (millimol) | 3.76 | 0.62 | 0.62 | 0.31 | 0.91 | 2.74 | 3.8 |
| T (° C.) |  | 125 | 125 | 110 | 110 | 95 | 95 | 125 |
| Mn | 1 h 40 min. | 9,700 | 53,000 | 30,600 | 39,000 | 34,700 | 6,600 | 8,300 |
|  | 3 h 30 min. | 15,000 | 69,000 | 47,600 | 70,000 | 44,100 | 9,400 | 11,100 |
|  | 7 h | 19,800 | 107,000 | 87,000 | 105,000 | 58,400 | 12,900 | 14,400 |
|  | 20 h |  |  |  |  | 126,800 | 22,200 |  |
| Conv. (%) | 1 h 40 min. | 35 | 33.8 | 17.5 | 17 | 14 | 10.4 | 25 |
|  | 3 h 30 min. | 52.8 | 50.6 | 30 | 26.5 | 17.7 | 20.2 | 44 |
|  | 7 h | 70.2 | 78.5 | 51 | 45 | 28.4 | 30 | 60 |
|  | 20 h |  |  |  |  | 61.6 | 53 |  |
| P | 1 h 40 min. | 1.13 | 1.35 | 1.15 | 1.2 | 1.64 | 1.33 | 1.14 |
|  | 3 h 30 min. | 1.18 | 1.53 | 1.18 | 1.39 | 1.50 | 1.27 | 1.11 |
|  | 7 h | 1.17 | 1.47 | 1.38 | 1.52 | 1.43 | 1.25 | 1.10 |
|  | 20 h |  |  |  |  | 1.59 | 1.14 |  |

|  |  | Comparative Example No. | | | | | | |
| --- | --- | --- | --- | --- | --- | --- | --- | --- |
|  |  | 10 | 11 | 12 | 13 | 14 | 15 | 16 |
| Stable free radical | Nature | Tempo | Tempo | Tempo | Tempo | Tempo |  | DTBN |
|  | Amount x (millimol) | 21.8 | 3.72 | 1.34 | 0.77 | 21.8 |  | 9.24 |
| Initiator | Nature | Benz. Per. | Benz. Per. | Benz. Per. | Benz. Per. | Benz. Per. | Benz. Per. | Benz. Per. |

-continued

| | | Comparative Example No. | | | | | | |
|---|---|---|---|---|---|---|---|---|
| | | 10 | 11 | 12 | 13 | 14 | 15 | 16 |
| | Amount y (millimol) | 16.94 | 2.85 | 1.03 | 0.62 | 16.94 | 16.94 | 3.71 |
| T (° C.) | | 125 | 125 | 125 | 125 | 110 | 125 | 125 |
| Mn | 1 h 40 min. | | 18,500 | | 33,500 | | 17,000 | |
| | 3 h 30 min. | | | | | | | |
| | 7 h | | 36,900 | 33,000 | 66,500 | | | 4,500 |
| | 20 h | 3,300 | | | | | | |
| Conv. (%) | 1 h 40 min. | | 19 | | 23 | 0 | 72 | 0 |
| | 3 h 30 min. | | | | | 0 | | 0 |
| | 7 h | | 51.8 | 57 | 61 | 0 | | 9 |
| | 20 h | 16 | | | | 0 | | |
| P | 1 h 40 min. | | | | 1.62 | | 2.8 | |
| | 3 h 30 min. | | | | | | | |
| | 7 h | | 1.49 | 1.42 | 1.53 | | | 1.17 |
| | 20 h | 1.32 | | | | | | |

What is claimed is:

1. Process for the polymerization or copolymerization of at least one monomer by the radical route in the presence of a stable free radical comprising a sequence of formula

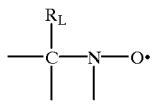

(1)

in which the monovalent $R_L$ radical has a molar mass greater than 15, wherein the process results in polymers or copolymers with a weight-average molecular mass greater than 10,000 gram/mol and the degree of conversion of monomer to polymer or copolymer is greater than 50%.

2. Process according to claim 1, characterized in that $R_L$ has a molar mass greater than 30.

3. Process according to claim 2, characterized in that $R_L$ has a molar mass of between 40 and 450.

4. Process according to claim 1, characterized in that the remaining valencies of the carbon atom and of the nitrogen atom of the formula (1) are bonded to monovalent radicals.

5. Process according to claim 1, characterized in that $R_L$ comprises a phosphoryl group.

6. Process according to claim 5, characterized in that $R_L$ is represented by the formula

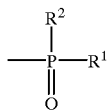

(2)

in which $R^1$ and $R^2{}_1$ which can be identical or different, are chosen from halogens or alkyl, cycloalkyl, alkoxy, aryloxy, aryl, aralkyloxy, perfluoroalkyl or aralkyl radicals.

7. Process according to claim 6, characterized in that $R^1$ and $R^2$ comprise from one to 20 carbon atoms.

8. Process according to claim 1, characterized in that $R_L$ comprises at least one aromatic ring.

9. Process according to claim 8, characterized in that $R_L$ is a phenyl radical.

10. Process according to claim 1, characterized in that the stable free radical is tert-butyl 1-diethylphosphono-2,2-dimethylpropyl nitroxide.

11. Process according to claim 9, characterized in that the stable free radical is tert-butyl 1-phenyl-2-methylpropyl nitroxide.

12. Process according to claim 1, characterized in that the stable free radical is present in the proportion of 0.005% to 5% by weight of the sum of the mass of polymerizable monomer and of stable free radical.

13. Process according to claim 1, characterized in that a free-radical initiator is present.

14. Process according to claim 13, characterized in that the free-radical initiator is present in the proportion of 50 to 50,000 ppm based on the mass of polymerizable monomer.

15. Process according to claim 1, characterized in that it results in polymers or copolymers with a weight-average molecular mass ranging from 100,000 gram/mol to 400,000 gram/mol measured by gel permeation chromatography.

16. Process according to claim 1, characterized in that at least one polymerizable monomer is vinylaromatic.

17. Process according to claim 16, characterized in that at least one vinylaromatic monomer is styrene.

18. Process according to claim 1, characterized in that the temperature is between 90 and 120° C.

19. Process according to claim 18, characterized in that the temperature is between 100 and 120° C.

20. Process according to claim 1, characterized in that the temperature is between 120 and 200° C.

21. Process according to claim 15, wherein the stable free radical is present in the proportion of 0.005% to 5% by weight of the sum of the mass of the monomer and of the stable free radical and wherein a free-radical initiator is present in the proportion of 50 to 50,000 ppm based on the mass of the monomer.

22. Process according to claim 21, wherein the $R_L$ has a molar mass of between 40 and 450.

23. Process according to claim 22, wherein the remaining valencies of the carbon atom and of the nitrogen atom of the formula (1) are bonded to monovalent radicals.

24. Process for the polymerization or copolymerization of at least one monomer by the radical route in the presence of a stable free radical comprising a sequence of formula

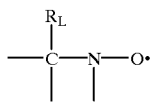

in which the monovalent $R_L$ has a molar mass greater than 15 and comprises a phosphoryl group.

25. Process according to claim 24, wherein the process results in polymers or copolymers with a weight-average molecular mass greater than 10,000 gram/mol and the degree of conversion of monomer to polymer or copolymer is greater than 50%.

26. Process according to claim 25, wherein the process results in polymers or copolymers with a weight-average molecular mass ranging from 100,000 gram/mol to 400,000 gram/mol.

27. Process according to claim 26, wherein the stable free radical is present in the proportion of 0.005% to 5% by weight of the sum of the mass of the monomer and of the stable free radical and wherein a free-radical initiator is present in the proportion of 50 to 50,000 ppm based on the mass of the monomer.

28. Process according to claim 27, wherein the $R_L$ has a molar mass of between 40 and 450.

29. Process according to claim 28, wherein the remaining valencies of the carbon atom and of the nitrogen atom of the formula (1) are bonded to monovalent radicals.

30. Process for the polymerization or copolymerization of at least one monomer by the radical route in the presence of a stable free radical comprising a sequence of formula

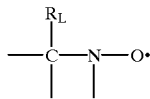

in which the monovalent $R_L$ has a molar mass greater than 15, wherein a hydrogen atom is bonded to the carbon atom of the sequence.

31. Process according to claim 30, wherein the process results in polymers or copolymers with a weight-average molecular mass greater than 10,000 gram/mol and the degree of conversion of monomer to polymer or copolymer is greater than 50%.

32. Process according to claim 31, wherein the process results in polymers or copolymers with a weight-average molecular mass ranging from 100,000 gram/mol to 400,000 gram/mol.

33. Process according to claim 32, wherein the stable free radical is present in the proportion of 0.005% to 5% by weight of the sum of the mass of the monomer and of the stable free radical and wherein a free-radical initiator is present in the proportion of 50 to 50,000 ppm based on the mass of the monomer.

34. Process according to claim 33, wherein the $R_L$ has a molar mass of between 40 and 450.

35. Process according to claim 34, wherein the remaining valencies of the carbon atom and of the nitrogen atom of the formula (1) are bonded to monovalent radicals.

36. Process according to claim 2, wherein the remaining valencies of the carbon atom and of the nitrogen atom of the formula (1) are bonded to monovalent radicals.

37. Process according to claim 36, wherein the temperature is between 100 and 120° C.

38. Process according to claim 36, wherein the temperature is between 120 and 200° C.

39. Process according to claim 24, wherein the remaining valencies of the carbon atom and of the nitrogen atom of the formula (1) are bonded to monovalent radicals.

40. Process according to claim 39, wherein the temperature is between 100 and 120° C.

41. Process according to claim 39, wherein the temperature is between 120 and 200° C.

42. Process according to claim 35, wherein the temperature is between 100 and 120° C.

43. Process according to claim 35, wherein the temperature is between 20 and 200° C.

* * * * *